United States Patent
Tomita et al.

(10) Patent No.: US 8,679,997 B2
(45) Date of Patent: Mar. 25, 2014

(54) CERAMIC CLAY, CERAMIC FORMED ARTICLE, AND CERAMIC STRUCTURE, AND MANUFACTURING METHODS THEREOF

(75) Inventors: Takahiro Tomita, Chita (JP); Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 182 days.

(21) Appl. No.: 13/069,888

(22) Filed: Mar. 23, 2011

(65) Prior Publication Data

US 2011/0244176 A1    Oct. 6, 2011

(30) Foreign Application Priority Data

Mar. 30, 2010    (JP) .................................. 2010-078244

(51) Int. Cl.
- C04B 33/00    (2006.01)
- C04B 33/24    (2006.01)
- C04B 35/03    (2006.01)
- C04B 35/04    (2006.01)

(52) U.S. Cl.
USPC ........... 501/141; 501/142; 501/143; 501/108; 501/119

(58) Field of Classification Search
USPC ......... 501/141, 142, 143, 144, 108, 118, 119, 501/121
See application file for complete search history.

(56) References Cited

U.S. PATENT DOCUMENTS

| | | | | |
|---|---|---|---|---|
| 4,309,222 A | * | 1/1982 | Hoyt, 4th | 106/487 |
| 5,399,329 A | | 3/1995 | Schutz et al. | |
| 6,183,609 B1 | * | 2/2001 | Kawasaki et al. | 204/252 |
| 6,593,265 B2 | * | 7/2003 | Stamires et al. | 502/73 |
| 2005/0221974 A1 | | 10/2005 | Tomita | |
| 2006/0035778 A1 | * | 2/2006 | Tomita | 501/141 |
| 2008/0032883 A1 | * | 2/2008 | Jones | 501/145 |
| 2008/0076832 A1 | * | 3/2008 | Winters et al. | 514/770 |
| 2009/0214819 A1 | | 8/2009 | Tomita | |

FOREIGN PATENT DOCUMENTS

| | | |
|---|---|---|
| JP | 3227039 | 8/2001 |
| WO | 2005/095302 A1 | 10/2005 |
| WO | 2006/058846 A1 | 6/2006 |
| WO | 2008/044497 A1 | 4/2008 |
| WO | 2008/077451 A2 | 7/2008 |

OTHER PUBLICATIONS

Japanese Office Action, Japanese Application No. 2010-078244, dated Jun. 25, 2013 (2 pages).

* cited by examiner

*Primary Examiner* — Kaj K Olsen
*Assistant Examiner* — Noah Wiese
(74) *Attorney, Agent, or Firm* — Burr & Brown, PLLC

(57) ABSTRACT

The ceramic clay is provided by kneading a forming raw material containing a ceramic forming material. The forming raw material contains, in addition to the ceramic forming material, a layered double hydroxide represented by a predetermined chemical formula in an amount of from 0.01 to 5 mass % based on the total amount of the layered double hydroxide and the ceramic forming material. The layered double hydroxide turns into a gel when dispersed in water, and when the layered double hydroxide is dispersed in water at a concentration of 6 mass %, the layered double hydroxide has a viscosity of from 1000 to 20000 mPa·s.

20 Claims, No Drawings

CERAMIC CLAY, CERAMIC FORMED ARTICLE, AND CERAMIC STRUCTURE, AND MANUFACTURING METHODS THEREOF

BACKGROUND OF THE INVENTION

1. Field of the Invention

The present invention relates to a ceramic clay, a ceramic formed article, and a ceramic structure, and manufacturing methods thereof.

2. Description of the Related Art

Ceramic products are usually manufactured through methods such as jiggering, extrusion, injection molding, press molding, and sheet forming. However, ceramic raw material powders, when used alone, cannot satisfy plasticity, shape retention property, and the like necessary for manufacturing ceramic products. Therefore, after adding water, an organic binder, and the like to the powders, the resulting ceramic forming raw material is molded or formed into ceramic products. For example, in extrusion, there is disclosed a manufacturing method of a ceramic structure which includes extruding a forming raw material (clay), which has been obtained by kneading a ceramic raw material, water, an organic binder, and the like, and therefore has improved plasticity, drying and firing the extrudate (refer to, for example, Patent Document 1).

As the amount of an organic binder to be added in order to provide ceramics with plasticity and shape retention property becomes greater, the resulting ceramics have improved moldability or formability. For example, when a large-sized structure or a structure having a complex cell structure, the demand for which is increasing in recent years, is manufactured, a kneaded clay (clay) having good moldability or formability becomes more necessary than that in the manufacture of a small-sized structure or a ceramic structure having a simple cell structure. As a result, a large amount of an organic binder has to be added.

However, when the amount of the organic binder is large, a space occupied by the organic binder becomes a defect at the time of molding or forming because the organic binder disappears upon firing, leading to deterioration in mechanical strength of the resulting ceramic structure. In a large-sized structure, there has been a problem that the temperature inside the structure becomes higher than that on the external surface of the structure due to burning heat when the organic binder burns during the firing and defects such as cracks appear because of a thermal stress due to an inner/outer temperature difference of the structure. It not only deteriorates the mechanical strength of the structure but also greatly reduces a production yield. Furthermore, a $CO_2$ or harmful gas generated and released to the atmosphere after burning of the organic binder during the firing has raised a problem in environmental respects such as air pollution and global warming.

With a view to overcoming such problems, Patent Documents 2 and 3 disclose a ceramic clay containing a layered double hydroxide such as hydrotalcite. The layered double hydroxide such as hydrotalcite is, similar to the organic binder, also effective for enhancing the fluidity of the clay and improving the moldability or formability. Addition of a layered double hydroxide therefore enables reduction in the amount of the organic binder, making it possible to suppress the problems such as generation of defects or harmful gas upon firing which will otherwise occur when the amount of the organic binder is large.

The amount of the layered double hydroxide necessary for reducing the amount of the organic binder and thereby overcoming the above problems is however as large as about 6 mass %. A ceramic structure manufactured using a ceramic clay containing such a large amount of a layered double hydroxide inevitably has other problems such as an increase in the manufacturing cost and deterioration in product properties such as increase in a thermal expansion coefficient.

[Patent Document 1] Japanese Patent No. 3227039
[Patent Document 2] WO 2005/095302
[Patent Document 3] WO 2008/044497

SUMMARY OF THE INVENTION

With the foregoing in view, the present invention has been made. A chief object of the invention is to provide a ceramic clay containing a layered double hydroxide at a reduced content without impairing good moldability or formability and thereby to achieve cost reduction and property improvement of a ceramic structure to be manufactured using the ceramic clay.

In order to achieve the above object, a ceramic clay, a ceramics formed article, and a ceramic structure, and manufacturing methods of them are provided according to the invention.

According to a first aspect of the present invention, a ceramic clay is obtained by kneading a forming raw material containing a ceramic forming material, wherein the forming raw material contains, in addition to the ceramic forming material, a layered double hydroxide in an amount of from 0.01 to 5 mass % based on the total amount of the layered double hydroxide and the ceramic forming material. The layered double hydroxide is represented by the following formula (I):

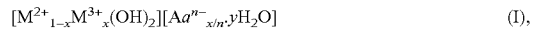

$$[M^{2+}_{1-x}M^{3+}_{x}(OH)_2][Aa^{n-}_{x/n} \cdot yH_2O] \quad (I),$$

wherein $M^{2+}$, $M^{3+}$, and $Aa^{n-}$ represent a divalent cation, a trivalent cation, and an anion other than a carbonate ion, respectively, n stands for a valence of the anion ($1 \leq n \leq 3$), x represents a composition ratio of the trivalent cation ($M^{3+}$) in the sum of the divalent cation ($M^{2+}$) and the trivalent cation ($M^{3+}$) and satisfies the following range: ($0.1 \leq x \leq 0.4$) and y stands for the number of moles of water. The layered double hydroxide turns into a gel when dispersed in water, and has a viscosity of from 1000 to 20000 mPa·s when dispersed in water at a concentration of 6 mass %.

According to a second aspect, the ceramic clay as described above in the first aspect is provided, which shows a sheet extrusion pressure of 5 MPa or less.

According to a third aspect, the ceramic clay as described above in the first or second aspects is provided, which has a true stress of 20 kPa or greater at a true strain of 0.05 as measured in a uniaxial compression test.

According to a fourth aspect, the ceramic clay as described above in any of the first to third aspects is provided, which further contains an organic binder at a content of 2 mass % or less as a superaddition based on the total amount of the ceramic forming material and the layered double hydroxide.

According to a fifth aspect the ceramic clay as described above in any of first to fourth aspects is provided, wherein the layered double hydroxide is a hydrotalcite represented by the following formula (II):

$$Mg_{1-x}Al_x(OH)_2Ab^{n-}_{x/n} \cdot mH_2O \quad (II),$$

wherein $Ab^{n-}$ represents a carboxylate ion, n stands for a valence ($1 \leq n \leq 3$) of the carboxylate ion, x stands for a composition ratio of Al in the sum of Mg and Al and satisfies the following range: $0.1 \leq x \leq 0.4$, and m stands for the number of moles of water in the hydrotalcite.

According to a sixth aspect, the ceramic clay as described above in any of the first to fifth aspects is provided, wherein the layered double hydroxide is a hydrotalcite represented by the following formula (III):

$$Mg_6Al_2(OH)_{16}Ac^{n-}{}_{x/n} \cdot 4H_2O \qquad (III),$$

wherein $Ac^{n-}$ represents any of an acetate ion, a propionate ion, and a lactate ion, and n stands for a valence ($1 \leq n \leq 3$) of the ion.

According to a seventh aspect, the ceramic clay as described above in any of the first to sixth aspects is provided, further containing a hydrophilic polymer.

According to an eighth aspect, the ceramic clay as described above in the seventh aspect is provided, wherein the hydrophilic polymer is a methacrylic acid polymer.

According to a ninth aspect, a ceramic formed article is obtained by molding or forming the ceramic clay as described in any of the first to eighth aspects.

According to a tenth aspect, the ceramic formed article as described above in the ninth aspect is provided, which is a honeycomb formed article having a honeycomb form.

According to an eleventh aspect, a ceramic structure obtained by firing the ceramic formed article as described above in the ninth or tenth aspects.

According to a twelfth aspect, a manufacturing method of a ceramic clay is provided, including a step of kneading a forming raw material containing a ceramic forming material, wherein the forming raw material contains, in addition to the ceramic forming material, a layered double hydroxide in an amount of from 0.01 to 5 mass % based on the total amount of the ceramic forming material, and the layered double hydroxide and the layered double hydroxide is represented by the following formula (I):

$$[M^{2+}{}_{1-x}M^{3+}{}_x(OH)_2][Aa^{n-}{}_{x/n} \cdot yH_2O] \qquad (I),$$

wherein $M^{2+}$, $M^{3+}$, and $Aa^{n-}$ represent a divalent cation, a trivalent cation, and an anion other than a carboxylate ion, respectively, n stands for a valence of the anion ($1 \leq n \leq 3$), x stands for a composition ratio of the trivalent cation ($M^{3+}$) in the sum of the divalent cation ($M^{2+}$) and the trivalent cation ($M^{3+}$) and satisfies the following range: $0.1 \leq x \leq 0.4$, and y stands for the number of moles of water. The layered double hydroxide turns into a gel when dispersed in water, and has a viscosity of from 1000 to 20000 mPa·s when dispersed in water at a concentration of 6 mass %.

According to a thirteenth aspect, a manufacturing method of a ceramic clay as described above in the twelfth aspect is provided, wherein the ceramic clay shows a sheet extrusion pressure of 5 MPa or less.

According to a fourteenth aspect, the manufacturing method of a ceramic clay as described above in the twelfth or thirteenth aspects is provided, wherein the ceramic clay has a true stress of 20 kPa or greater as measured at a true strain of 0.05 in a uniaxial compression test.

According to a fifteenth aspect, the manufacturing method of a ceramic clay as described above in any of the twelfth to fourteenth aspects is provided, wherein the forming raw material contains an organic binder and a content thereof as a superaddition is 2 mass % or less based on the total amount of the ceramic forming material and the layered double hydroxide.

According to a sixteenth aspect, the manufacturing method of a ceramic clay as described above in any of the twelfth to fifteenth aspects is provided, wherein the layered double hydroxide is a hydrotalcite represented by the following formula (II):

$$Mg_{1-x}Al_x(OH)_2Ab^{n-}{}_{x/n} \cdot mH_2O \qquad (II)$$

wherein $Ab^{n-}$ represents a carboxylate ion, n stands for a valence ($1 \leq n \leq 3$) of the carboxylate ion, x stands for a composition ratio of Al in the sum of Mg and Al and satisfies the following range: $0.1 \leq x \leq 0.4$, and m stands for the number of moles of water in the hydrotalcite.

According to a seventeenth aspect, the manufacturing method of a ceramic clay as described above in any of the twelfth to sixteenth aspects is provided, wherein the layered double hydroxide is a hydrotalcite represented by the following formula (III):

$$Mg_6Al_2(OH)_{16}Ac^{n-}{}_{x/n} \cdot 4H_2O \qquad (III),$$

wherein $Ac^{n-}$ represents any of an acetate ion, a propionate ion, and a lactate ion, and n stands for a valence ($1 \leq n \leq 3$) of the ion.

According to an eighteenth aspect, the manufacturing method of a ceramic clay as described above in any of the twelfth to seventeenth aspects is provided, wherein the forming raw material further contains a hydrophilic polymer.

According to a nineteenth aspect, the manufacturing method of a ceramic clay as described above in the eighteenth aspect is provided, wherein the hydrophilic polymer is a methacrylic acid polymer.

According to a twentieth aspect, a manufacturing method of a ceramic formed article is provided, including a step of molding or forming the ceramic clay obtained using the method as described above in any of the twelfth to nineteenth aspects.

According to a twenty-first aspect, the manufacturing method of a ceramic formed article as described above in the twentieth as is provided, including a step of molding or forming the ceramic clay into a honeycomb shape to obtain a honeycomb formed article.

According to a twenty-second aspect a manufacturing method of a ceramic structure is provided, including a step of further firing the ceramic formed article obtained using the method as described above in the twentieth or twenty-first aspects.

Compared with a conventional ceramic clay containing a layered double hydroxide, the ceramic clay of the invention containing a layered double hydroxide, which turns into a gel when dispersed in water and has a viscosity of from 1000 to 20000 mPa·s when dispersed in water at a concentration of 6 mass %, shows good moldability or formability even if it has a smaller content of the layered double hydroxide than the conventional ceramic clay. Suppressing the content of the layered double hydroxide at a low level enables to reduce a manufacturing cost of a ceramic structure from the ceramic clay and at the same time, enables to provide a product having improved properties by decreasing the influence of the layered double hydroxide thereon (for example, increase in thermal expansion coefficient).

The ceramic formed article of the invention is obtained by using the ceramic clay of the invention having good moldability or formability so that clogging of a die or deformation such as collapse is suppressed during molding or forming and defective forming such as fine split is also suppressed.

The ceramic structure of the invention is obtained by firing the ceramic formed article of the invention. The ceramic clay of the invention used for obtaining the ceramic formed article shows good moldability or formability even if the content of a layered double hydroxide is small. By reducing the content of the layered double hydroxide, the ceramic structure of the invention as a final product can be obtained at a reduced production cost and at the same time, it has improved properties because the influence of the layered double hydroxide on the product properties is lessened.

The manufacturing method of the ceramic clay, the manufacturing method of the ceramic formed article, and the manufacturing method of the ceramic structure according to the invention facilitate the manufacture of the ceramic clay, ceramic formed article, and ceramic structure of the invention having the above-described advantages.

DETAILED DESCRIPTION OF THE INVENTION

The invention will next be described referring to specific embodiments. The invention is not construed as being limited thereto but can be changed, modified or improved based on the knowledge of those skilled in the art without departing from the scope of the invention.

The ceramic clay of the invention is a ceramic clay available by kneading a forming raw material containing a ceramic forming material. The forming raw material contains, in addition to the ceramic forming material, a layered double hydroxide in an amount of from 0.01 to 5 mass % based on the total amount of the layered double hydroxide and the ceramic forming material. At the same time, the layered double hydroxide is represented by the following formula (I):

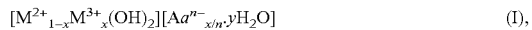
$$[M^{2+}{}_{1-x}M^{3+}{}_x(OH)_2][Aa^{n-}{}_{x/n}\cdot yH_2O] \qquad (I),$$

turns into a gel when dispersed in water, and has a viscosity of from 1000 to 20000 mPa·s when dispersed in water at a concentration of 6 mass %.

In the above formula (I), $M^{2+}$, $M^{3+}$, and $Aa^{n-}$ represent a divalent cation, a trivalent cation, and an anion other than a carbonate ion, respectively; n stands for a valence of the anion ($1 \leq n \leq 3$); and x represents a composition ratio of the trivalent cation ($M^{3+}$) in the sum of the divalent cation ($M^{2+}$) and the trivalent cation ($M^{3+}$) (a composition ratio of the divalent cation ($M^{2+}$) is ($1-x$)). More specifically, though depending on the combination of the cation and the anion, the composition ratio usually satisfies the following range: $0.1 \leq x \leq 0.4$, preferably $0.2 \leq x \leq 0.33$ and y stands for the number of moles of water in the layered double hydroxide, more specifically, an arbitrary value, depending on the combination of the cation and the anion or the value of x.

Examples of the divalent cation include divalent metal ions such as $Mg^{2+}$, $Ca^{2+}$, $Sr^{2+}$, $Zn^{2+}$, $Ni^{2+}$, $Co^{2+}$, $Fe^{2+}$, and $Mn^{2+}$. They may be used either singly or in combination. Examples of the trivalent cation include trivalent metal ions such as $Al^{3+}$, $Fe^{3+}$, $Cr^{3+}$, $Ti^{3+}$, $Y^{3+}$, $Ce^{3+}$, and $Mo^{3+}$. They may be used either singly or in combination. Examples of the anion other than the carbonate ion include carboxylate ions, preferably $CH_3COO^-$, $C_2H_5COO^-$, and $CH_3CH(OH)COO^-$. They may be used either singly or in combination.

Examples of the ceramic forming material include alumina forming materials, mullite forming materials, zirconia forming materials, cordierite forming materials, aluminum titanate forming materials, silicon nitride forming materials, silicon carbide forming materials, and aluminum nitride forming materials. Examples of components constituting these forming materials include oxides containing an element contained in the forming materials. Examples of the component constituting the cordierite forming materials include oxides, hydroxides, and carbonates containing at least one element selected from the group consisting of magnesium, aluminum, and silicon. They are, for example, talc, kaolin, alumina, aluminum hydroxide, silica, and magnesia.

The layered double hydroxide to be used in the invention is represented by the above formula (I) and at the same time, has the following property, that is, it turns into a gel when dispersed in water and has a viscosity of from 1000 to 20000 mPa·s when dispersed in water at a concentration of 6 mass %. The term "viscosity" as used herein means an apparent viscosity at a shear rate of 38 $s^{-1}$ as measured using a cone/plate viscometer.

Such a property of the layered double hydroxide is attributable to easy exfoliation of it between layers. Described specifically, the layered double hydroxide has the above-described property because interlayer exfoliation of the layered double hydroxide occurs in water and it turns into flakes. When the layered double hydroxide which has been dispersed in water and turned into a gel as described above is diluted with water and its particle size distribution is measured, it has an average particle size of from 0.01 to 0.4 µm. This is also one of the properties of the layered double hydroxide in flake form.

The layered double hydroxide in ceramic clay binds water to the surface of its particles via electrostatic attraction to form a thick water film thereon. Since the particles of the layered double hydroxide having on the surface thereof a water film are present between matrix particles (ceramic forming material), the clay can exhibit appropriate fluidity and has improved moldability or formability. The layered double hydroxide having such a property, that is, the layered double hydroxide which is in flake form in water, has a greater surface area than a layered double hydroxide which is not in flake form, when they are equal in mass, so that it has a high moldability or formability improving effect. As a result, addition of it in a smaller amount (mass), more specifically, in an amount of from about one-tenth to one-third of the layered double hydroxide which is not in flake form produces almost an equal moldability or formability improving effect. Incidentally, when a layered double hydroxide which does not exfoliate between layers in water and does not turn into a flake is dispersed in water at a concentration of 6 mass %, it has a viscosity of from 1 to 100 mPa·s, much lower than that of the layered double hydroxide which exfoliates in water and turns into a flake when it is dispersed in water at the same concentration.

The layered double hydroxide to be used in the invention is contained in an amount of from 0.01 to 5 mass %, preferably from 0.05 to 5 mass %, more preferably from 0.1 to 5 mass %, each based on the total amount of the layered double hydroxide and the ceramic forming material. When the content of the layered double hydroxide in the total amount of the layered double hydroxide and the ceramic forming material is less than 0.01 mass %, the resulting mixture is sometimes inferior in moldability or formability. When it exceeds 5 mass %, on the other hand, a production cost of a ceramic structure manufactured using the ceramic clay increases and at the same time, there is a possibility of it deteriorating product properties, for example, increasing a thermal expansion coefficient.

The ceramic clay of the invention has a sheet extrusion pressure of preferably 5 MPa or less, more preferably 4.5 MPa or less, still more preferably 4 MPa or less. The term "sheet extrusion pressure" as used herein means a pressure applied to the clay when a test is carried out using an apparatus conforming to JIS K7199 and is an index for fluidity. A specific measuring method will be described later. The lower the sheet extrusion pressure, the higher the fluidity. The clay having a sheet extrusion pressure exceeding 5 MPa cannot sometimes exhibit good moldability or formability because of insufficient fluidity.

In addition, the ceramic clay of the invention has a true stress of preferably 20 kPa or greater at a true strain of 0.05 as measured in a uniaxial compression test, more preferably 30 kPa or greater; still more preferably 40 kPa or greater. Incidentally, the "uniaxial compression test" is carried out using a test piece and an apparatus conforming to JIS A1216 and a specific measuring method of the true stress will be described later. Hardness of the clay against an external force, that is, a shape retention property can be evaluated based on the true stress at a true strain of 0.05 as measured in a uniaxial compression test. The greater the true stress, the better the shape retention property of the formed article obtained using the clay.

In the invention, the forming raw material may contain, in addition to the ceramic forming material and the layered double hydroxide, an organic binder, water as a dispersion medium, a dispersant, a pore forming agent, and the like as needed. When an organic binder is added, the content of it as a superaddition is preferably 2 mass % or less, more preferably 1.5 mass % or less, still more preferably 1 mass % or less, each based on the total amount of the ceramic forming material and the layered double hydroxide. The ceramic clay of the invention contains, as an essential component, a layered double hydroxide which is in flake form and has a high moldability or formability improving effect so that it is not necessary to add a large amount of the organic binder having a same kind of the effect. Defects or generation of a harmful gas upon firing can be suppressed by reducing the content of the organic binder.

Examples of the organic binder preferably used in the invention include organic polymers, more specifically, hydroxypropoxylmethyl cellulose, hydroxypropylmethyl cellulose, methyl cellulose, hydroxyethyl cellulose, carboxymethyl cellulose, and polyvinyl alcohol. The organic binders may be used either singly or in combination.

In the invention, the forming raw material may contain a hydrophilic polymer. The hydrophilic polymer functions as a water retention agent in the clay and is effective for improving the fluidity of the clay further. Examples of the hydrophilic polymer preferably used in the invention include methacrylic acid polymers, acrylic acid polymers, sulfonic acid polymers, polyvinyl alcohols, and polyethylene oxides. When the hydrophilic polymer is added, the content of it as a superaddition is preferably 1 mass % or less, more preferably 0.8 mass % or less, still more preferably 0.6 mass % or less, each based on the total amount of the ceramic forming material and the layered double hydroxide. When the content of the hydrophilic polymer as a superaddition exceeds 1 mass % based on the total amount of the ceramic forming material and the layered double hydroxide, defects may occur or an organic gas is generated upon firing as in the case of the organic binder.

As the layered double hydroxide to the used in the invention, those having a proper constitution can be used, depending on the kind of the ceramic forming material. For example, when a cordierite forming material is used as the ceramic forming material, layered double hydroxides having $Mg^{2+}$ as the divalent cation and $Al^{3+}$ as the trivalent cation can be used; when a silicon nitride forming material is used, magnesium oxide or yttrium oxide is used as the sintering aid thereof so that those having $Mg^{2+}$ as the divalent cation and $Y^{3+}$ as the trivalent cation can be used. As the anion other than a carbonate ion, appropriate anions can be selected depending on the synthesis conditions of the layered double hydroxide or production conditions of ceramics. The layered double hydroxides to be used in the invention may be used either singly or in combination.

As the layered double hydroxide to be used in the invention, hydrotalcites each represented by the following formula (II) are preferred from the standpoint of a price and an impurity content. In particular, synthetic hydrotalcite is preferred because it is inexpensive.

$$Mg_{1-x}Al_x(OH)_2Ab^{n-}{}_{x/n}\cdot mH_2O \qquad (II)$$

wherein $Ab^{n-}$ represents a carboxylate ion, n stands for the valence ($1 \leq n \leq 3$) of the carboxylate ion, x stands for a composition ratio of Al in the sum of Mg and Al and satisfies the following range: $0.1 \leq x \leq 0.4$; and m stands for the number of moles of water in the hydrotalcite.

As the layered double hydroxide to be used in the invention, hydrotalcites each represented by the following formula (III) are more preferred because they have good moldability or formability.

$$Mg_6Al_2(OH)_{16}Ac^{n-}{}_{x/n}\cdot 4H_2O \qquad (III),$$

wherein $Ac^{n-}$ represents any of an acetate ion, a propionate ion, and a lactate ion, and n stands for a valence ($1 \leq n \leq 3$) of the ion.

The layered double hydroxide to be used in the invention can exfoliate between layers in water. For interlayer exfoliation of the layered double hydroxide in water, a method described below is preferably employed, for example, when it is a hydrotalcite. The layered double hydroxide to be used in the invention is however not limited to those which have turned into flakes by using the following process.

Step (1):
Heat treat a hydrotalcite at 500° C. for 20 hours to obtain the corresponding thermally decomposed hydrotalcite.

Step (2)
Charge the thermally decomposed hydrotalcite obtained in the first step (1) in an aqueous solution of magnesium acetate having a predetermined concentration and stir the resulting mixture to obtain a slurry.

Step (3):
Continue stirring or leave it alone for long hours until the slurry obtained in the step (2) turns into a gel.

In the interlayer exfoliation mechanism in this process, in the first step (1), a hydrotalcite is thermally decomposed to remove $CO_2$ or $H_2O$ between layers of the hydrotalcite and in the subsequent step (2), due to contact with an acetate ion, the acetate ion is introduced between the layers of the hydrotalcite. In the third step (3), the acetate ion introduced between the layers draws water to expand the interlayer distance. As a result, interlayer exfoliation occurs to obtain hydrotalcite in flake form. The hydrotalcite has a hydrophilic surface, so that when it turns into flakes and has a high specific surface area, the viscosity of the slurry increases and becomes apparently a gel. The thin hydrotalcite sheets in gel form obtained using the above process can be used for the manufacture of a clay by kneading with other forming raw material components such as ceramic forming material. In order to obtain a cordierite clay, for example, a magnesium ion remaining in the gel is used as a portion of the forming raw material.

When the ceramic clay of the invention is used for the manufacture of a porous ceramic structure, a pore forming agent may be incorporated in the forming raw material. The pore forming agent serves as a template of pores and it increases a porosity of the ceramic structure by forming, in the ceramic structure, pores having a desired shape, size, or distribution. Examples of such a pore forming agent include graphite, flour, starch, phenolic resin, polymethyl methacrylate, polyethylene, polyethylene terephthalate, foamed resin (acrylonitrile-based plastic balloon), and water absorbing resins. As such a pore forming agent, since it disappears instead of forming pores, foamed resin are especially preferred from the standpoint of suppressing generation of $CO_2$ or a harmful gas and generation of cracks. When the pore forming agent is added, the content of the pore forming agent is preferably 10 mass % or less, more preferably 8 mass % or less, based on the total amount of the forming raw materials.

It is difficult to determine the content of water as a dispersion medium with certainty because it differs depending on the forming raw material to be used. It is preferred to control the amount of water to give the sheet extrusion pressure of 5 MPa or less. For example, when a cordierite clay is manufactured, the content of water as a superaddition is from about 10 to 50 mass % based on the total amount of the ceramic forming material and the layered double hydroxide. When the content of water as a superaddition is less than 10 mass % based on the total amount of the ceramic forming material and the layered double hydroxide, the sheet extrusion pressure cannot be reduced to 5 MPa or less, which may lead to a problem upon molding or forming operation. On the other hand, contents exceeding 50 mass % are not preferred because they may lead to not only a marked reduction in the sheet extrusion pressure but also a marked damage in shape retention property.

No particular limitation is imposed on the kneading method of the above forming raw materials and examples of it include methods using a kneader, vacuum pug mill, or the like.

The ceramic formed article of the invention is available by molding or forming the ceramic clay.

The shape of the ceramic formed article is not especially limited, and examples include a sheet shape, a tube shape, a lotus root shape, and a honeycomb shape. Of these, a honeycomb formed article in which a plurality of cells penetrating between two end faces have been formed using honeycomb-shaped partition walls is preferred as the ceramic formed article. When the honeycomb formed article is used in filter application such as DPF, it is preferred that end portions of the cells are alternately plugged in two end face portions. The whole shape of the ceramic formed article is not especially limited, and examples of the shape of the honeycomb formed article include a cylindrical shape, a square pole shape, and a triangular pole shape. In addition, the cell shape (cell shape in a section vertical relative to a cell forming direction) of the honeycomb formed article is not especially limited and examples include a quadrangular shape, a hexagonal shape, and a triangular shape.

A method of molding or forming a clay into the ceramic formed article of the invention is not especially limited and examples include conventionally known ones such as jiggering, extrusion, injection forming, press molding, and sheet forming. Preferred examples of a method of molding or forming a clay into a honeycomb-shaped ceramic formed article include a method of extruding the above ceramic clay through a die having a desired cell shape, partition wall thickness, or cell density. A drying method of the ceramic formed article is not especially limited, and examples include conventionally known ones such as hot air drying, microwave drying, dielectric drying, reduced-pressure drying, vacuum drying, and freezing drying. Of these, a drying method using hot air drying and microwave drying or dielectric drying in combination is preferred, because it enables to rapidly and uniformly dry the entirety of the formed article.

The ceramic formed article obtained in the above manner may be converted into a calcined article by calcination (degreasing). The term "calcination" means an operation of burning the formed article to remove organic matters (organic binder, pore forming agent, dispersant, etc.) therefrom. In general, since the burning temperature of the organic binder is from about 100 to 300° C. and that of the pore forming agent is from about 200 to 800° C., the calcining temperature may be set at from about 200 to 1000° C. A calcination time is not especially limited but is usually from about one to ten hours. A calcination atmosphere is properly selected in accordance with the kind of the ceramic forming material, and specific examples of it include air atmosphere, oxygen atmosphere, nitrogen atmosphere, argon atmosphere, and vacuum atmosphere.

The ceramic structure of the invention is available by firing the above-described ceramic formed article (calcined article if necessary). The term "firing" means an operation of sintering and densifying the forming raw material in the calcined article to secure a predetermined strength. Since firing conditions (temperature·time) differ with the kind of the forming raw material, appropriate conditions may be selected in accordance with the kind. For example, when a cordierite forming material is used as the ceramic forming material, the ceramic formed article is fired at preferably from 1300 to 1500°, more preferably at more preferably 1350 to 1450° C. When the firing temperature is less than 1350° C., a target crystal phase (cordierite phase) is sometimes not obtained. When the temperature exceeds 1500° C., on the other hand, the article is sometimes molten. A firing atmosphere is selected properly in accordance with the kind of the ceramic forming material, and specific examples include air atmosphere, oxygen atmosphere, nitrogen atmosphere, argon atmosphere, and vacuum atmosphere.

In the manufacturing method of a ceramic clay according to the invention, the ceramic clay is obtained by kneading a forming raw material containing a ceramic forming material. The forming raw material contains, in addition to the ceramic forming material, a layered double hydroxide in an amount of from 0.01 to 5 mass % based on the total amount of the layered double hydroxide and the ceramic forming material. At the same time, the layered double hydroxide is represented by the above formula (I), turns into a gel when dispersed in water, and has a viscosity of from 1000 to 20000 mPa·s when dispersed in water at a concentration of 6 mass %. Details of the forming raw material to be used in the manufacturing method of a ceramic clay, the kneading method, and the like are as described above.

In the manufacturing method of a ceramic formed article according to the invention, the ceramic formed article is obtained by molding or forming the ceramic clay obtained using the above manufacturing method of a ceramic clay. In the manufacturing method of a ceramic formed article, the preferred molding or forming method, preferred shape of the formed article, and preferred drying method or calcination conditions when drying or calcination is performed after molding or forming are as described above.

In the manufacturing method of a ceramic structure according to the invention, the ceramic structure is obtained by firing a ceramic formed article obtained using the above manufacturing method of a ceramic formed article. The preferred firing conditions in the manufacturing method of a ceramic structure are as described above.

EXAMPLES

The invention will be described in further detail based on Examples. It should however be borne in mind that the invention is not limited to or by these examples.

Examples 1 to 21 and Comparative Examples 1 to 3

A layered double hydroxide (of the above formula (I) wherein $Aa^{n-}$ represents $CO_3^{2-}$) containing between layers thereof a $CO_3^{2-}$ ion was heat treated for 20 hours at 500° C. in the air. On the other hand, aqueous solutions obtained by dissolving predetermined salts shown in Tables 1 and 2 in water at a concentration of about 0.3 mol/L were prepared, respectively, and the heat-treated layered double hydroxide was charged in the resulting aqueous solutions. After stirring for 30 to 60 minutes, the resulting mixtures were allowed to stand for 10 hours or greater to obtain layered double hydroxides Nos. 1 to 9 in gel form having, as $M^{2+}$, $M^{3+}$, and $Aa^{n-}$ in the formula (I), a divalent cation, a trivalent cation, and an anion shown in Tables 1 and 2, respectively and x stands for a value shown in these tables. Further, the layered double hydroxide (of the above formula (I) wherein $Aa^{n-}$ represents $CO_3^{2-}$) containing between layers thereof a $CO_3^{2-}$ ion and used for the preparation of Layered double hydroxides Nos. 1 to 9 was used as Layered double hydroxide No. 10 which was not in a gel form. When the layered double hydroxide was charged in the aqueous salt solution, their ratio was adjusted so that the concentration of the layered double hydroxide be 20 mass %.

Layered double hydroxides Nos. 1 to 10 thus obtained were then dispersed in water at a concentration of 6 mass % and their viscosities were measured. The results are as shown in Tables 1 and 2. It can be judged that Layered double hydroxides Nos. 1 to 9 having a viscosity of from 1000 to 20000 mPa·s have turned into flakes as a result of exfoliation between layers, while Layered double hydroxide No. 10 having a viscosity as low as 40 mPa·s and still containing a $CO_3^{2-}$ ion between layers has not turned into a flake.

Next, as the ceramic forming material, talc having an average particle size of 24 μm, kaolin (Kaolin A) having an average particle size of 7 μm, kaolin (Kaolin B) having an average particle size of 3 μm, alumina (Alumina A) having an average particle size of 6 μm, alumina (Alumina B) having an average particle size of 2 μm, aluminum hydroxide having an average particle size of 3 μm, silica having an average particle size of 23 μm, titania having an average particle size of 0.2 μm, silicon carbide having an average particle size of 33 μm, and silicon having an average particle size of 5 μm were prepared. They were mixed with the above layered double hydroxides in gel form (with the proviso that layered double hydroxide No. 10 was not in gel form) at proportions shown in Tables 3 to 5. An organic binder (methyl cellulose) and a hydrophilic polymer (methacrylic acid polymer) were also added at proportions shown in these tables, followed by the addition and kneading with a predetermined amount of water to obtain Clays Nos. 1 to 24. The proportions of the layered double hydroxides shown in Tables 3 to 5 are not those of the gels but only of the layered double hydroxides in the gels. The proportions of the organic binder and the hydrophilic polymer shown in these tables are proportions of them as supperaddition based on the total amount of the ceramic forming material and the layered double hydroxide.

TABLE 1

| | No. of layered double hydroxide | | | | |
|---|---|---|---|---|---|
| | 1 | 2 | 3 | 4 | 5 |
| $M^{2+}$ in the formula (I) | $Mg^{2+}$ | $Mg^{2+}$ | $Mg^{2+}$ | $Mg^{2+}$ | $Mg^{2+}$ |
| $M^{3+}$ in the formula (I) | $Al^{3+}$ | $Al^{3+}$ | $Al^{3+}$ | $Al^{3+}$ | $Al^{3+}$ |
| $Aa^{n-}$ in the formula (I) | $CH_3COO-$ | $CH_3COO-$ | $CH_3COO-$ | $C_2H_5COO-$ | $CH_3CH(OH)COO-$ |
| Value of x in the formula (I) | 0.333 | 0.250 | 0.167 | 0.250 | 0.250 |
| Viscosity (mPa·s) when dispersed in water at a concentration of 6 mass % | 3200 | 8000 | 1500 | 7300 | 9100 |
| Kind of salt used for preparation of aqueous solution | Magnesium acetate | Magnesium acetate | Magnesium acetate | Magnesium propionate | Magnesium lactate |
| Concentration (mass %) of layered double hydroxide in gel | 20 | 20 | 20 | 20 | 20 |

TABLE 2

| | No. of layered double hydroxide | | | | |
|---|---|---|---|---|---|
| | 6 | 7 | 8 | 9 | 10 |
| $M^{2+}$ in the formula (I) | $Ca^{2+}$ | $Sr^{2+}$ | $Zn^{2+}$ | $Mg^{2+}$ | $Mg^{2+}$ |
| $M^{3+}$ in the formula (I) | $Al^{3+}$ | $Al^{3+}$ | $Al^{3+}$ | $Fe^{3+}$ | $Al^{3+}$ |
| $Aa^{n-}$ in the formula (I) | $CH_3COO-$ | $CH_3COO-$ | $CH_3COO-$ | $CH_3COO-$ | $CO_3^{2-}$ |
| Value of x in the formula (I) | 0.250 | 0.250 | 0.250 | 0.250 | 0.250 |
| Viscosity (mPa·s) when dispersed in water at a concentration of 6 mass % | 9500 | 8800 | 8400 | 7600 | 40 |
| Kind of salt used for preparation of aqueous solution | Calcium acetate | Strontium acetate | Zinc acetate | Magnesium acetate | — |
| Concentration (mass %) of layered double hydroxide in gel | 20 | 20 | 20 | 20 | — |

TABLE 3

| | | No. of clay | | | | | | | |
|---|---|---|---|---|---|---|---|---|---|
| | | 1 | 2 | 3 | 4 | 5 | 6 | 7 | 8 |
| No. of layered double hydroxide used | | 1 | 2 | 3 | 4 | 5 | 2 | 2 | 2 |
| Composition | Layered double hydroxide (mass %) | 2.0 | 2.0 | 2.0 | 2.0 | 2.0 | 2.0 | 2.0 | 0.1 |
| | Talc (mass %) | 36.7 | 36.8 | 35.9 | 36.8 | 36.8 | 36.8 | 38.6 | 39.7 |
| | Kaolin A (mass %) | 18.7 | 18.4 | 18.6 | 18.4 | 18.4 | 18.4 | 18.4 | 18.5 |
| | Kaolin B (mass %) | — | — | — | — | — | — | — | — |
| | Alumina A (mass %) | 14.5 | 13.6 | 14.3 | 13.6 | 13.6 | 13.6 | 13.6 | 14.0 |
| | Alumina B (mass %) | — | — | — | — | — | — | — | — |
| | Aluminum hydroxide (mass %) | 13.9 | 15.1 | 14.4 | 15.1 | 15.1 | 15.1 | 15.1 | 15.2 |
| | Silica (mass %) | 14.2 | 14.1 | 14.7 | 14.1 | 14.1 | 14.1 | 14.1 | 12.5 |
| | Titania (mass %) | — | — | — | — | — | — | — | — |
| | Silicon carbide (mass %) | — | — | — | — | — | — | — | — |
| | Silicon (mass %) | — | — | — | — | — | — | — | — |
| | Organic binder (mass %) *1 | 1.0 | 1.0 | 1.0 | 1.0 | 1.0 | 1.0 | 2.0 | 1.0 |
| | Hydrophilic polymer (mass %) *2 | 0.5 | 0.5 | 0.5 | 0.5 | 0.5 | — | 0.5 | 0.5 |

*1, *2: superaddition

TABLE 4

| | | No. of clay | | | | | | | |
|---|---|---|---|---|---|---|---|---|---|
| | | 9 | 10 | 11 | 12 | 13 | 14 | 15 | 16 |
| No. of layered double hydroxide used | | 2 | 2 | 2 | 2 | 6 | 7 | 8 | 9 |
| Composition | Layered double hydroxide (mass %) | 1.0 | 4.0 | 5.0 | 2.0 | 2.0 | 2.0 | 2.0 | 2.0 |
| | Talc (mass %) | 38.3 | 33.9 | 32.7 | — | — | — | — | — |
| | Kaolin A (mass %) | 18.4 | 18.2 | 18.3 | — | — | — | — | — |
| | Kaolin B (mass %) | — | — | — | 8.0 | 8.0 | 8.0 | 8.0 | 8.0 |
| | Alumina A (mass %) | 13.8 | 13.2 | 13.1 | — | — | — | — | — |
| | Alumina B (mass %) | — | — | — | 49.0 | 49.0 | 49.0 | 49.0 | 49.0 |
| | Aluminum hydroxide (mass %) | 15.1 | 15.0 | 15.0 | — | — | — | — | — |
| | Silica (mass %) | 13.3 | 15.7 | 16.6 | — | — | — | — | — |
| | Titania (mass %) | — | — | — | 41.0 | 41.0 | 41.0 | 41.0 | 41.0 |
| | Silicon carbide (mass %) | — | — | — | — | — | — | — | — |
| | Silicon (mass %) | — | — | — | — | — | — | — | — |
| | Organic binder (mass %) *1 | 1.0 | 1.0 | 1.0 | 1.0 | 1.0 | 1.0 | 1.0 | 1.0 |
| | Hydrophilic polymer (mass %) *2 | 0.5 | 0.5 | 0.5 | 0.5 | 0.5 | 0.5 | 0.5 | 0.5 |

*1, *2: superaddition

TABLE 5

| | | No. of clay | | | | | | | |
|---|---|---|---|---|---|---|---|---|---|
| | | 17 | 18 | 19 | 20 | 21 | 22 | 23 | 24 |
| No. of layered double hydroxide used | | 2 | 6 | 7 | 8 | 9 | — | 10 | 2 |
| Composition | Layered double hydroxide (mass %) | 2.0 | 2.0 | 2.0 | 2.0 | 2.0 | — | 2.0 | 0.008 |
| | Talc (mass %) | — | — | — | — | — | 39.8 | 36.8 | 39.7 |
| | Kaolin A (mass %) | — | — | — | — | — | 18.5 | 18.4 | 18.5 |
| | Kaolin B (mass %) | — | — | — | — | — | — | — | — |
| | Alumina A (mass %) | — | — | — | — | — | 14.0 | 13.6 | 14.0 |
| | Alumina B (mass %) | — | — | — | — | — | — | — | — |
| | Aluminum hydroxide (mass %) | — | — | — | — | — | 15.2 | 15.1 | 15.2 |
| | Silica (mass %) | — | — | — | — | — | 12.5 | 14.1 | 12.5 |
| | Titania (mass %) | — | — | — | — | — | — | — | — |
| | Silicon carbide (mass %) | 78.0 | 78.0 | 78.0 | 78.0 | 78.0 | — | — | — |
| | Silicon (mass %) | 20.0 | 20.0 | 20.0 | 20.0 | 20.0 | — | — | — |
| | Organic binder (mass %) *1 | 1.0 | 1.0 | 1.0 | 1.0 | 1.0 | 1.0 | 1.0 | 1.0 |
| | Hydrophilic polymer (mass %) *2 | 0.5 | 0.5 | 0.5 | 0.5 | 0.5 | 0.5 | 0.5 | 0.5 |

*1, *2: superaddition

Honeycomb structures of Examples 1 to 21 and Comparative Examples 1 to 3 were obtained by molding or forming Clays Nos. 1 to 24 thus obtained into a honeycomb form by using an extruder, drying the resulting formed articles with microwave and hot air, and then firing the dried articles at 1420° C. for 7 hours in the air atmosphere. The honeycomb structures of Examples 1 to 21 and Comparative Examples 1 to 3 thus obtained were evaluated in the below-described manners for "defective forming" "clogging of a die", "collapse", "drying crack" upon drying, "firing crack" upon firing, and "firing melt". The results are shown in Tables 6 to 8. With regard to Clays Nos. 1 to 24 used for the manufacture of the honeycomb structures, "sheet extrusion pressure" and "true stress at a true strain of 0.05 in uniaxial compression test" were measured in the below-described methods, respectively, and the results are shown in these tables.

(Sheet Extrusion Pressure)

The pressure to be applied to a clay when the clay is extruded at a fixed volume flow rate is measured in an apparatus conforming to JIS K7199. For this measurement, the apparatus having a cylinder inner diameter of 25 mm and a slit die having a cross-section of 0.3×5 mm and a length of 4 mm is used. The clay is filled in the cylinder; the piston is pressed at a rate of 2.5 mm/min; and a sheet is extruded from the exit of the slit die. The value, at this time, of a pressure sensor attached to the tip of the piston is designated as a sheet extrusion pressure. The moldability or formability of a portion (rib) of the honeycomb structure can be shown schematically by using the above method, by which the fluidity of the clay can be evaluated. The lower the sheet extrusion pressure, the better the fluidity of the clay, meaning that the clay can be easily molded or formed into a honeycomb structure. In other words, the lower the sheet extrusion pressure, the higher the fluidity.

(True Stress at a True Strain of 0.05 in Uniaxial Compression Test)

A uniaxial compression test is performed using a test piece and apparatus conforming to JIS A1216 to measure a true stress at a true strain of 0.05. Based on the true stress, the hardness of a clay against an external force, that is, a shape retention property can be evaluated. The greater the true stress, the better the shape retention property of the formed article.

(Defective Forming)

The term "defective forming" means that the clay lacks fluidity. When the clay lacks fluidity, the honeycomb article obtained by extrusion of the clay has fine splits on the rib or outer wall of the formed article. The defective forming is therefore evaluated by observing the presence or absence of a fine split on the rib or outer wall of the formed article and the degree of the fine split. The following are specific evaluation standards.

Excellent: No fine split is observed and the formed condition of the article is excellent.

Good: The formed condition of the article is good though a fine split is observed in a part of the outer wall.

Acceptable: Fine splits are observed on both a rib inside and the outer wall and the formed condition of the article is not good but it is on an acceptable level.

Failure: Fine splits are observed on both a rib inside and the outer wall and the formed condition of the article is on an unacceptable level.

(Clogging of Die)

The "clogging of die" is evaluated by examining the presence or absence of a breakage of a formed article which has occurred successively in an extrusion direction. The following are specific evaluation standards.

Excellent: No clogging of a die.

Good: Clogging of a die only in one rib.

Acceptable: Clogging of a die is observed in a plurality of ribs but it is on an acceptable level.

Failure: Clogging of a die is observed in a plurality of ribs and it is on an unacceptable level.

(Collapse)

The "collapse" is evaluated by visually examining the presence or absence of cell collapse in a formed article and at the same time, examining the presence or absence of cell collapse which inhibits light transmission by exposing the article to light in an extrusion direction from one end face thereof and observing it from the other end face. The following are specific evaluation standards.

Excellent: No cell collapse during molding or forming and a cell after drying has a shape similar to that of a die slit.

Good: No cell collapse during molding or forming, but a cell after drying has partially a shape a little different from that of a die slit (deformed parts can be seen in the cell).

Acceptable: Cell collapse has occurred during molding or forming, and the cell after drying has a shape not similar to that of a die slit. However, there is no cell collapse inhibiting light transmission when the article is exposed to light from one end face in an extrusion direction and then observed from the other end face.

Failure: Cell collapse has occurred during molding or forming and the cell after drying has a shape not similar to that of a die slit. There occurs cell collapse inhibiting light transmission when the article is exposed to light from one end face in an extrusion direction and observed from the other end face.

(Drying Crack)

The "drying crack" is a state after drying of a formed article and it is discontinuity of a rib or cell of the dried article which should be continuous. It is evaluated by visually confirming the presence or absence of a crack in the appearance of a dried article and at the same time, confirming the presence or absence of a crack inside the dried article by exposing the dried article to light in an extrusion direction from one end face thereof and observing it from the other end face. The following are specific evaluation standards.

Excellent: No drying crack

Good: Only a surface layer which is less than 1 cm deep from the end face slightly cracks, and the crack portion can easily be removed by cutting the end face after drying.

Acceptable: A crack extends 1 cm or more from the end face to inside, but the crack portion can be removed by cutting the end face after drying.

Failure: A crack extends 1 cm or more from the end face to inside and the crack portion cannot be removed by cutting the end face after drying.

(Firing Crack)

"Firing crack" is a state after firing of a dried article and it is discontinuity of a rib or cell of the fired article which should be continuous. It is evaluated by visually confirming the presence or absence of a crack in the appearance of a honeycomb structure (fired article) and at the same time, confirming the presence or absence of a crack inside the fired article by exposing the fired article to light in an extrusion direction from one end face thereof and observing it from the other end face. The following are specific evaluation standards.

Excellent: No firing crack

Good: Only one firing crack.

Failure: Two or more firing cracks.

(Firing Melt)

"Firing melt" is a state after firing of a dried article under which the article has lost its original shape. It is evaluated by measuring the dimensions of a dried article and a fired article to determine a size shrinkage ratio due to firing and at the same time, observing the appearance of the fired article. The following are specific evaluation standards.

Excellent: Shrinkage in dimensions is 10% or less, and an external shape is similar to that of a dried article.

Good: Shrinkage in dimensions is 10% or more, and an external shape is similar to that of a dried article.

Acceptable: Shrinkage in dimensions is 10% or more, and an external shape is impaired compared with that of a dried article.

Failure: Shrinkage in dimensions is 10% or more, and an external shape is greatly impaired compared with that of a dried article

TABLE 6

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| No. of clay | 1 | 2 | 3 | 4 | 5 | 6 | 7 | 8 |
| Sheet extrusion pressure (MPa) | 2.8 | 2.5 | 3.1 | 3.3 | 2.7 | 2.9 | 1.8 | 4.9 |
| True stress (kPa) at true strain of 0.05 in uniaxial compression test | 81 | 84 | 77 | 72 | 79 | 80 | 96 | 51 |
| Defective forming | Excellent | Excellent | Good | Good | Excellent | Excellent | Excellent | Good |
| Clogging of die | Excellent | Excellent | Excellent | Excellent | Excellent | Excellent | Excellent | Good |
| Collapse | Excellent | Excellent | Excellent | Excellent | Excellent | Excellent | Excellent | Good |
| Drying crack | Good | Good | Good | Good | Good | Good | Excellent | Good |
| Firing crack | Excellent | Excellent | Excellent | Excellent | Excellent | Excellent | Excellent | Excellent |
| Firing melt | Excellent | Excellent | Excellent | Excellent | Excellent | Excellent | Excellent | Excellent |

TABLE 7

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| No. of clay | 9 | 10 | 11 | 12 | 13 | 14 | 15 | 16 |
| Sheet extrusion pressure (MPa) | 3.6 | 2.4 | 2.4 | 3.9 | 4.5 | 4.3 | 4.6 | 4.8 |
| True stress (kPa) at true strain of 0.05 in uniaxial compression test | 60 | 116 | 125 | 76 | 70 | 69 | 72 | 75 |
| Defective forming | Good | Excellent | Excellent | Good | Good | Good | Good | Good |
| Clogging of die | Good | Excellent | Excellent | Excellent | Good | Good | Good | Good |
| Collapse | Excellent | Excellent | Excellent | Good | Good | Good | Good | Good |
| Drying crack | Good | Good | Good | Good | Good | Good | Good | Good |
| Firing crack | Excellent | Excellent | Excellent | Excellent | Excellent | Excellent | Excellent | Excellent |
| Firing melt | Excellent | Excellent | Good | Excellent | Excellent | Excellent | Excellent | Excellent |

TABLE 8

|  | Ex. 17 | Ex. 18 | Ex. 19 | Ex. 20 | Ex. 21 | Comp. Ex. 1 | Comp. Ex. 2 | Comp. Ex. 3 |
|---|---|---|---|---|---|---|---|---|
| No. of clay | 17 | 18 | 19 | 20 | 21 | 22 | 23 | 24 |
| Sheet extrusion pressure (MPa) | 3.8 | 4.2 | 4.4 | 4.3 | 4.1 | Unmeasurable | 5.7 | 5.4 |
| True stress (kPa) at true strain of 0.05 in uniaxial compression test | 81 | 72 | 73 | 76 | 75 | 108 | 32 | 48 |
| Defective forming | Good | Good | Good | Good | Good | Failure | Acceptable | Acceptable |
| Clogging of die | Excellent | Good | Good | Good | Good | Failure | Failure | Failure |
| Collapse | Good | Good | Good | Good | Good | Good | Acceptable | Acceptable |
| Drying crack | Good | Good | Good | Good | Good | Acceptable | Acceptable | Acceptable |
| Firing crack | Excellent | Excellent | Excellent | Excellent | Excellent | Good | Good | Good |
| Firing melt | Excellent | Excellent | Excellent | Excellent | Excellent | Excellent | Excellent | Excellent |

As shown in Tables 6 to 8, the honeycomb structures of Examples 1 to 21 manufactured using the clays (Clays Nos. 1 to 21) obtained by kneading forming raw materials containing the layered double hydroxides in flake form (Layered double hydroxides Nos. 1 to 9) in an amount of from 0.01 to 5 mass % have received a good evaluation in any evaluation item and thus are excellent in moldability or formability of the clay and product properties after firing. On the other hand, the honeycomb structure of Comparative Example 1 manufactured using the clay (Clay No. 22) obtained by kneading the forming raw material not containing the layered double hydroxide has received an inferior evaluation particularly in "defective forming" and "clogging of slit", suggesting very poor moldability or formability of the clay. The honeycomb structure of Comparative Example 2 manufactured using the clay (Clay No. 23) obtained by kneading a forming raw material which contains a layered double hydroxide not in flake form (Layered double hydroxide No. 10), though the content of the layered double hydroxide is equal to that of Examples has received an inferior evaluation particularly in "clogging of die", suggesting the poor moldability or formability of the clay. The honeycomb structure of Comparative Example 3 manufactured using the clay (Clay No. 24) containing a layered double hydroxide in flake form (Layered double hydroxide No. 2) but having a content of it less than 0.01 mass % has received an inferior evaluation particularly in "clogging of slit", suggesting the poor moldability or formability of the clay.

The ceramic clay, ceramic formed article, and ceramic structure, and manufacturing methods thereof according to the invention can be used preferably for, for example, ceramic structures to be used for various ceramic products such as ceramic filter and catalyst carrier, and manufacture thereof.

What is claimed is:

1. A ceramic clay obtained by kneading a forming raw material containing a ceramic forming material comprising, in addition to the ceramic forming material, a layered double hydroxide in flake form in an amount of from 0.01 to 5 mass % based on the total amount of the layered double hydroxide and the ceramic forming material;

wherein the layered double hydroxide is represented by the following formula (I):

$$[M^{2+}{}_{1-x}M^{3+}{}_x(OH)_2][Aa^{n-}{}_{x/n}\cdot yH_2O] \qquad (I),$$

wherein $M^{2+}$, $M^{3+}$, and $Aa^{n-}$ represent a divalent cation, a trivalent cation, and an anion other than a carbonate ion, respectively, n stands for a valence of the anion ($1 \le n \le 3$), x represents a composition ratio of the trivalent cation ($M^{3+}$) in the sum of the divalent cation ($M^{2+}$) and the trivalent cation ($M^{3+}$) and satisfies the following range: $0.1 \le x \le 0.4$, and y stands for the number of moles of water;

wherein the layered double hydroxide in flake form turns into a gel when dispersed in water; and wherein the layered double hydroxide has a viscosity of from 1000 to 20000 mPa·s when dispersed in water at a concentration of 6 mass %.

2. The ceramic clay according to claim 1, which shows a sheet extrusion pressure of 5 MPa or less.

3. The ceramic clay according to claim 1, which has a true stress of 20 kPa or greater at a true strain of 0.05 as measured in a uniaxial compression test.

4. The ceramic clay according to claim 1, which comprises an organic binder at a content of 2 mass % or less as a superaddition based on the total amount of the ceramic forming material and the layered double hydroxide.

5. The ceramic clay according to claim 1, wherein the layered double hydroxide is a hydrotalcite represented by the following formula (II):

$$Mg_{1-x}Al_x(OH)_2Ab^{n-}{}_{x/n}\cdot mH_2O \qquad (II),$$

wherein $Ab^{n-}$ represents a carboxylate ion, n stands for a valence ($1 \le n \le 3$) of the carboxylate ion, x stands for a composition ratio of Al in the sum of Mg and Al and satisfies the following range: $0.1 \le x \le 0.4$, and m stands for the number of moles of water in the hydrotalcite.

6. The ceramic clay according to claim 1, wherein the layered double hydroxide is a hydrotalcite represented by the following formula (III):

$$Mg_{0.75}Al_{0.25}(OH)_2Aa^{n-}{}_{2/n}\cdot 0.5H_2O \qquad (III),$$

wherein $Ac^{n-}$ represents any of an acetate ion, a propionate ion, and a lactate ion, and n stands for a valence ($1 \le n \le 3$) of the ion.

7. The ceramic clay according to claim 1, further comprising a hydrophilic polymer.

8. The ceramic clay according to claim 7, wherein the hydrophilic polymer is a methacrylic acid polymer.

9. A ceramic formed article obtained by molding or forming the ceramic clay as claimed in claim 1.

10. The ceramic formed article as claimed in claim 9, which is a honeycomb formed article having a honeycomb form.

11. A ceramic structure obtained by forming the ceramic formed article as claimed in claim 9.

12. A manufacturing method of a ceramic clay comprising a step of kneading a forming raw material containing a ceramic forming material;

wherein the forming raw material comprises, in addition to the ceramic forming material, a layered double hydroxide in flake form in an amount of from 0.01 to 5 mass % based on the total amount of the ceramic forming material and the layered double hydroxide;

wherein the layered double hydroxide is represented by the following formula (I):

$$[M^{2+}{}_{1-x}M^{3+}{}_x(OH)_2][Aa^{n-}{}_{x/n}\cdot yH_2O] \qquad (I),$$

wherein $M^{2+}$, $M^{3+}$, and $Aa^{n-}$ represent a divalent cation, a trivalent cation, and an anion other than a carboxylate ion, respectively, n stands for a valence of the anion ($1 \le n \le 3$), x stands for a composition ratio of the trivalent cation ($M^{3+}$) in the sum of the divalent cation ($M^{2+}$) and the trivalent cation ($M^{3+}$) and satisfies the following range: $0.1 \le x \le 0.4$, and y stands for the number of moles of water;

wherein the layered double hydroxide in flake form turns into a gel when dispersed in water and wherein the layered double hydroxide has a viscosity of from 1000 to 20000 mPa·s when dispersed in water at a concentration of 6 mass %.

13. The manufacturing method of a ceramic clay as claimed in claim 12, wherein the ceramic clay shows a sheet extrusion pressure of 5 MPa or less.

14. The manufacturing method of a ceramic clay as claimed in claim 12, wherein the ceramic clay has a true stress of 20 kPa or greater at a true strain of 0.05 as measured in a uniaxial compression test.

15. The manufacturing method of a ceramic clay as claimed in claim 12, wherein the forming raw material comprises an organic binder and a content thereof as a superaddition is 2 mass % or less based on the total amount of the ceramic forming material and the layered double hydroxide.

16. The manufacturing method of a ceramic clay as claimed in claim 12, wherein the layered double hydroxide is a hydrotalcite represented by the following formula (II):

$$Mg_{1-x}Al_x(OH)_2Ab^{n-}{}_{x/n}\cdot mH_2O \qquad (II),$$

wherein $Ab^{n-}$ represents a carboxylate ion, n stands for a valence ($1 \le n \le 3$) of the carboxylate ion, x stands for a composition ratio of Al in the sum of Mg and Al and satisfies the following range: $0.1 \le x \le 0.4$, and m stands for the number of moles of water in the hydrotalcite.

17. The manufacturing method of a ceramic clay as claimed in claim 12, wherein the layered double hydroxide is a hydrotalcite represented by the following formula (III):

$$Mg_{0.75}Al_{0.25}(OH)_2Aa^{n-}{}_{2/n}\cdot 0.5H_2O \qquad (III),$$

wherein $Ac^{n-}$ represents any of an acetate ion, a propionate ion, and a lactate ion, and n stands for a valence ($1 \le n \le 3$) of the ion.

18. The manufacturing method of a ceramic clay as claimed in claim 12, wherein the forming raw material further comprises a hydrophilic polymer.

19. The manufacturing method of a ceramic clay as claimed in claim 18, wherein the hydrophilic polymer is a methacrylic acid polymer.

20. A manufacturing method of a ceramic formed article, comprising a step of molding or forming the ceramic clay obtained using the method as claimed in claim 12 into the ceramic formed article.

* * * * *